United States Patent [19]
Brown

[11] Patent Number: 5,791,451
[45] Date of Patent: Aug. 11, 1998

[54] TAPE DRIVE CONVEYOR SYSTEM WITH TWISTED CONFORMATION

[75] Inventor: Michael E. Brown, Mason, Ohio

[73] Assignee: E.F. Bavis & Associates, Inc., Maineville, Ohio

[21] Appl. No.: 699,397

[22] Filed: Aug. 19, 1996

[51] Int. Cl.⁶ .................................................. B65G 47/24
[52] U.S. Cl. .................. 198/409; 198/468.6; 198/750.1; 186/37; 186/41; 186/53
[58] Field of Search ........................ 198/409, 468.6, 198/750.1; 186/37, 41, 53

[56] References Cited

U.S. PATENT DOCUMENTS

| | | |
|---|---|---|
| 1,786,343 | 12/1930 | Griffith . |
| 2,128,594 | 8/1938 | Rasmussen . |
| 2,303,976 | 12/1942 | Bawcutt et al. . |
| 3,669,238 | 6/1972 | Folkes et al. ............................. 198/16 |
| 4,411,336 | 10/1983 | Anders .................................... 186/37 |
| 4,556,143 | 12/1985 | Johnson .................................. 198/841 |
| 4,624,359 | 11/1986 | Gross ...................................... 198/366 |
| 4,834,839 | 5/1989 | Harrison ................................. 198/839 |
| 4,915,547 | 4/1990 | Cahill et al. ............................ 406/87 |
| 4,930,621 | 6/1990 | Brown et al. ............................ 198/831 |
| 4,957,188 | 9/1990 | Bavis ...................................... 186/41 |
| 5,054,605 | 10/1991 | Bavis ...................................... 198/750 |
| 5,097,943 | 3/1992 | Kawasaki et al. ...................... 198/836.1 |
| 5,232,408 | 8/1993 | Brown ..................................... 472/140 |
| 5,353,887 | 10/1994 | Putnam ................................... 180/168 |
| 5,361,022 | 11/1994 | Brown ..................................... 318/375 |

Primary Examiner—Joseph E. Valenza
Assistant Examiner—Wonki Park
Attorney, Agent, or Firm—Dinsmore & Shohl LLP

[57] ABSTRACT

A flexible drive tape conveyor system for conveying items between at least two spaced apart stations includes a carrier member and at least one tape guide track having a tape guide. The drive tape is substantially inflexible in a direction transverse to its width, and is at least partially housed in the tape guide. At least a portion of a tape guide track and tape guide are twisted about their longitudinal axis so that the drive tape and its affected carrier member can be turned in a direction transverse to the width of the drive tape. A drive mechanism is used to selectively reciprocate the drive tape and the carrier member between the spaced apart stations.

18 Claims, 5 Drawing Sheets

TAPE DRIVE CONVEYOR SYSTEM WITH TWISTED CONFORMATION

TECHNICAL FIELD

This invention relates to an improved conveyor system for u se in drive-in banks and other remote transaction applications, wherein a flexible yet relatively longitudinally rigid drive tape is reciprocated between two or more spaced apart stations and wherein at least a portion of the drive tape is rotated about its longitudinal axis to twist the tape in a direction transverse to its width.

BACKGROUND OF THE INVENTION

In a growing variety of business applications, it is desirable and/or necessary to convey items such as currency, documents, food, messages and other items between spaced apart locations or stations. In many situations, a somewhat flexible, yet relatively longitudinally rigid, drive tape provides a reliable yet highly adaptable drive system which minimizes the requirements for expensive and inconvenient pneumatic set-ups or long lengths of chains and/or complex gearing arrangements to adapt to twists and turns along the transport path.

For example, U.S. Pat. No 5,054,605, which issued on Oct. 8, 1991 to Edward F. Bavis, shows and describes a preferred flexible drive conveyor system for use in drive-in banks and other remote transaction applications. Particularly, the Bavis '605 Patent sets forth a relatively simple and reliable conveyor system utilizing flexible tape as the drive medium. As set forth in this patent, the width and depth of the tape guide provided for the drive tape, is to be chosen to accommodate the natural tendency of the tape to bend somewhat under compression in a sinuous manner.

Additionally, U.S. Pat. No. 5,232,408, which issued to the present inventor, Michael E. Brown, sets forth an improved method of reciprocating a flexible drive tape about a cog wheel. At high speed, and/or high loads, flexible drive tapes have a tendency to fold and/or bind within the tape guides on either side of the cog wheel. The Brown '408 conveyor system provides an improved arrangement including peeler tips which significantly reduce the binding and/or folding of the drive tape as it's reciprocated about the cog wheel.

While the flexible tape drive conveyor systems disclosed in the prior Bavis and Brown patents provide many benefits over other conveyor systems known to the art, such as pneumatic and chain conveyors, flexible drive tapes in general, have an additional characteristic which has heretofore limited the use of such systems In order for a non-continuous drive tape to be both pushed and pulled within a tape guide, the drive tape must be essentially rigid in a direction transverse to the width of the tape. Thus, while the drive tape bends easily in a direction along its longitudinal axis, which allows it to curl around a cog wheel and to follow around curves and turns in the conveyor path along that longitudinal axis, the drive tape does not bend easily in a direction transverse to its width. In fact, the drive tape must have a certain amount of rigidity to optimally enable the "push and pull" requirements of a non-continuous, single drive setup.

The essential rigidity of the drive tape in at least one direction., however, has made it difficult in the past for a drive tape to be manipulated in a direction transverse to its width. Thus, it has been difficult for drive tape conveyor systems of the past to negotiate around obstructions or to make simple turns in a direction transverse to the drive tape width.

Chain link conveyors, non-rigid belt conveyors, rope conveyors and the like have been adapted to make turns in a direction both transverse to their width and their length. However, these conveyer systems require a continuous loop system because the same substantial flexibility of the drive belt (e.g. chain link, rope, canvas belt) which allows the belt to be turned in a direction transverse to its width also restricts the drive belt's ability to be both pushed and pulled without being a continuous loop or without having a drive mechanism at each end of the system.

For example, U.S. Pat. No. 1,786,343 to Griffith, shows a continuous loop flexible conveyor belt system wherein the belt is twisted through the use of rollers so that it can travel in a direction transverse to its width. However, the belt in Griffith is continuous, and, presumably, the flexibility which allows the conveyor belt to be turned in a direction transverse to its width also renders the belt too flexible to be both pushed and pulled within a guide track. Likewise, U.S. Pat. No. 4,556,143 to Johnson shows a chain link drive mechanism wherein, due to the inherent flexibility between links in the chain, the chain can be gradually turned about a large radius in the direction transverse to the chain's width, see FIG. 8 of Johnson. The chain link drive in Johnson must also be continuous, however, because the inherent flexibility between link; in the chain causes the chain to substantially collapse when its direction of travel is charged unless the chain is continuous.

An endless transmission belt conveyor system for moving bobbins is shown in U.S. Pat. No. 5,097,943 to Kawasaki, et al., wherein a continuous series of ropes or belts are used to both propel the bobbins and guide them about a predetermined path. However, the belts and/or ropes disclosed in the Kawasaki, et al. patent are continuous and substantially flexible in all directions Hence, continuous flexible conveyor systems which can be turned in a variety of directions are known. Unfortunately, however, the flexibility which allows continuous belt, chain, or rope conveyor systems to be manipulated in a multitude of directions also makes them generally unsuitable for a non-continuous drive belt system wherein substantial rigidity is required so that a drive tape or similar drive mechanism can withstand both compressive and tensing forces without substantial buckling, stretching, and/or decreases in the tape length.

Thus there is a need for a simple, inexpensive yet reliable conveyor system for moving items between spaced apart stations wherein the conveyor system can accommodate changes in essentially all directions to negotiate around obstructions, turn corners and the like. The present invention responds to those needs.

SUMMARY OF THE INVENTION

It is an object of the present invention to provide an improved tape drive conveyor system which obviates the problems discussed above.

It is a related object of the present invention to provide an improved tape drive conveyor system wherein the drive tape can be rotated about its longitudinal axis so that it can be moved and/or manipulated in a direction transverse to it:, width.

It is also an object of the present invention to provide an improved tape guide wherein the tape guide has a twisted conformation about its longitudinal axis such that the tape guide can rotate a drive tape and its attached carrier about its longitudinal axis in a direction transverse to the drive tape width.

These and additional objects are provided by the present invention. Specifically, the invention, in one embodiment, is directed to an improved conveyor system for reciprocating a carrier member between a plurality of stations. The system comprises a reciprocable, flexible drive tape having a longitudinal axis and a predetermined width wherein the tape is substantially inflexible in the direction transverse to its width. A drive mechanism engages the drive tape and selectively reciprocates the drive tape and a carrier member attached thereto between a plurality of spaced apart stations. The drive tape is at least partially housed in a tape guide which has a longitudinal axis and at least a portion of the tape guide is twisted along its longitudinal axis whereby the drive tape and an attached carrier member may be selectively reciprocated and manipulated both longitudinally in directions transverse to the width of the drive tape.

In a preferred embodiment of the present invention, the tape guide further comprises a longitudinal channel extending along the longitudinal axis of the tape guide for receiving and guiding the drive tape. The tape guide preferably has an outer surface wherein both the longitudinal channel and the outer surface of the tape guide are twisted along the longitudinal axis of the tape guide so that the outer surface is at least partially rotated relative to the longitudinal axis of the tape guide. The longitudinal channel is preferably twisted between about 0° and 90° relative to its longitudinal axis.

In another embodiment of the present invention, the improved conveyor+ system comprises a flexible drive tape having a longitudinal length and a predetermined width wherein the drive tape is substantially inflexible in a direction transverse to its width. A tape guide is provided wherein the drive tape is at least partially housed. The tape guide has two ends and a longitudinal axis extending therein between, with at least a portion of the tape guide having a twisted confirmation along its longitudinal axis so that the drive tape can be selectively reciprocated within the tape guide and the drive tape can be manipulated in a direction transverse to the width of the drive tape.

The improved drive tape conveyor system of the present invention allows a carrier member attached to the drive tape to be selectively reciprocated between at least two spaced apart stations and wherein the drive tape and carrier member attached thereto can be manipulated around poles, trees, walls and other obstructions which may exist between the spaced apart stations.

These and additional objects and advantages will be more apparent in view of the following drawings and detailed description.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
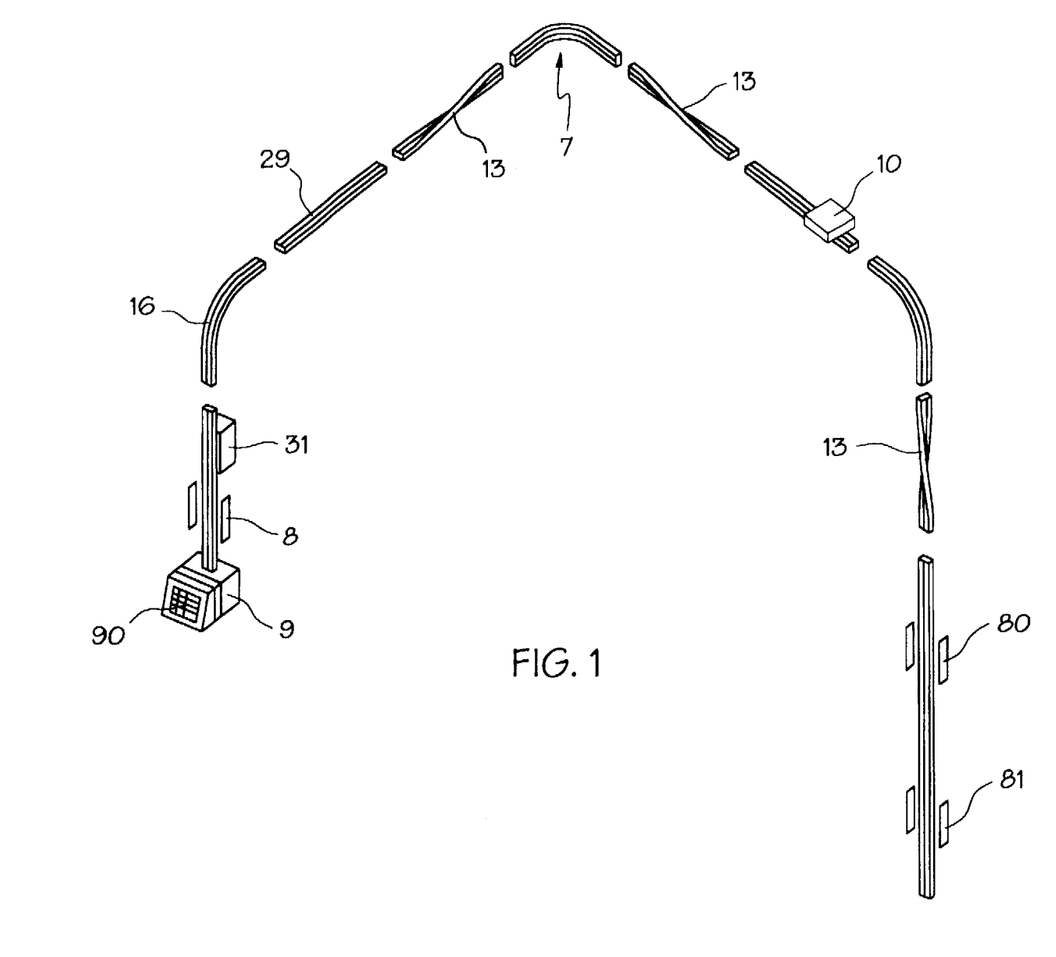
FIG. 1 is a schematic isometric view of a conveyor system made according to the present invention showing various tape guide track sections, spaced apart stations and a drive mechanism.

Referring now to the drawings in detail, wherein like numerals indicate the same elements throughout the views, FIG. 1 is a schematic isometric view of a conveyor system made according to the present invention. Specifically, FIG. 1 shows a conveyor system 7 which comprises a plurality of tape guide track sections, e.g. 29, 13 and 16, spaced apart stations 8, 80 and 81, a drive mechanism 9, a communication device 90 and a support attachment bracket 31. A drive tape, which is shown in greater detail in FIGS. 2 through 6, can be reciprocated within the tape guide sections, e.g. 209 13, and 16, between spaced apart stations, e.g., 8, 80 and 81. A carrier member 10, which can be attached to the drive tape, is reciprocated with the drive tape between spaced apart stations. All of the individual units of the conveyor system 7 are discussed in greater detail below.

Also shown in FIG. 1 is a prior art conveyor system. As is discussed in greater detail below, prior flexible conveyors were restricted in that a drive tape reciprocated between spaced apart stations could not be turned in a direction transverse to its width. Drive tapes used in conjunction the present invention are substantially inflexible in a direction transverse to their width, which heretofore has seriously limited the range of motion for prior art conveyor systems. As will be understood, the use of twisted tape guide track sections, e.g., 13, alleviates the restrictions of prior conveyor systems and increases the range of motion for the conveyor systems of the present invention. Thus, a carrier member (e.g. 10) attached to a drive tape at least partially housed in a tape guide track section (e.g. 16,13 and 29) has essentially unlimited range of movement through the use of straight guide track sections, e.g. 29, bent tape guide track sections, e.g. 16, and twisted tape guide track sections, e.g. 13. The tape guide track sections, e.g. 29, 16 and 13 are shown as modular units, but as will be understood, one tape guide track section could be bent and/or twisted as desired to form a conveyor system comprising only one tape guide track section. Likewise, a conveyor system, e.g. 7, can be assembled through the use of individual tape guide track sections which are straight, e.g. 299 twisted, e.g. 13, and/or bent, e.g. 16. Thus, the combination of tape guide track sections is essentially unlimited and the direction of travel of the reciprocated drive tape can be maneuvered through the appropriate combination of tape guide track sections to avoid obstructions and to negotiate corners and the like.

Figure 2:
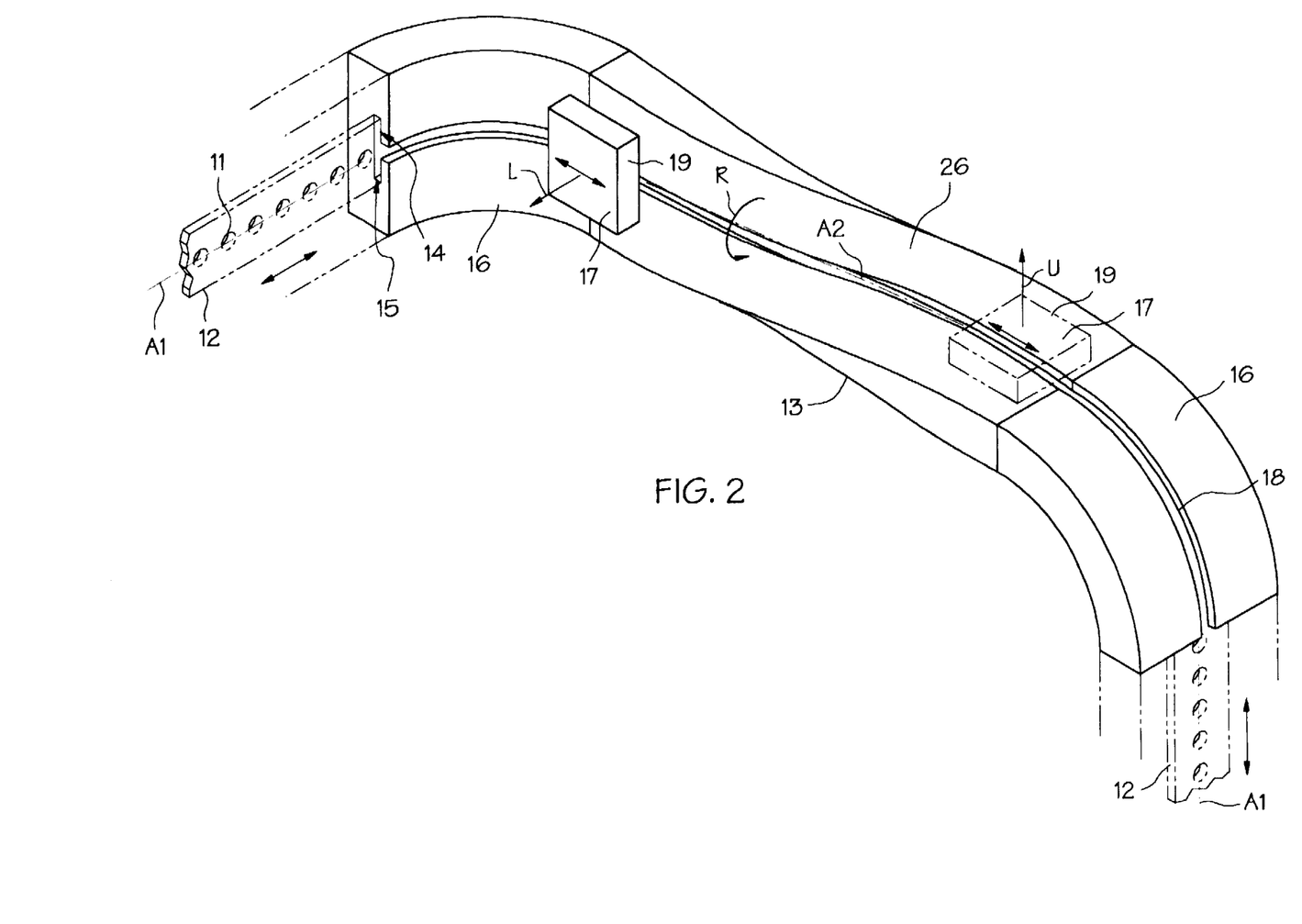
FIG. 2 is a partial schematic representation of a portion of a conveyor system of the present invention, showing a tape guide track rotated approximately 90° about its longitudinal axis.

FIG. 2 is a partial schematic representation of a twisted tape guide and drive tape arrangement made according to the present invention. Specifically, FIG. 2 discloses two 90° angle tape guide track sections 16 which have been bent in a direction transverse to their length, and a twisted tape guide track section 13 which has been rotated (e.g. in a direction R) about its longitudinal axis A2. Tape guide track sections 16 and 13 respectively define a part of a tape guide 15 having a longitudinal channel 14 for guiding drive tape 12 and a longitudinal axis A2. A longitudinal opening 18 is provided in tape guide 15 which is substantially parallel to longitudinal axis A2. As will be understood, drive tape 12 can be selectively reciprocated within channel 14. Drive tape 12 has a longitudinal axis A1 and as drive tape 12 is selectively reciprocated within longitudinal channel 14 of guide track section 13, the longitudinal axis A1 of drive tape 12 will preferably remain substantially parallel to the longitudinal axis A2 of longitudinal channel 14. Consequently, as will be explained, rotating or twisting; longitudinal channel 14 about its longitudinal axis A2 necessarily rotates drive tape 12 about its longitudinal axis A1 as drive tape 12 is reciprocated therewithin.

Tape guide track section 13 is illustrated as including an outer surface 26 which faces outwardly and laterally prior to the twist of tape guide track 13. Tape guide track section 13 is shown in FIG. 2 as being twisted about its longitudinal axis A2 in the direction R. As a result of such rotation, outer surface 26 (which was facing outwardly and upwardly in a direction U) faces outwardly and laterally (i.e., in a direction L) after being twisted. Likewise, carrier member 19 is shown in a second position after being reciprocated across guide track section 13 so that the outer surface 17 of carrier member 19 faces laterally (i.e., in a direction L). As can be appreciated, the longitudinal axis A1 of drive tape 12 and the longitudinal axis A2 of guide track section 13 remain substantially coaxial to one another at each point along twisted guide track section 13.

Also shown on FIG. 2 are drive tape perforations 11. Drive tape perforations 11 serve at least two purposes, they can be used to connect the carrier member, e.g., 19 to drive tape 12 with a connector (as shown in greater detail in FIG. 3, 4 and 5 and is discussed in greater detail below). Additionally, perforations 11 interact with the cogs of a cog wheel which is driven by a drive mechanism, e.g. 9, as shown in FIG. 1 to selectively reciprocate drive tape 12 within longitudinal channel 14. U.S. Pat. No. 5,232,408 (the '408 Patent) to Michael Brown, discloses a cog wheel, drive mechanism and drive tape system for a flexible drive tape conveyor system. The entire disclosure of the '408 Patent is hereby incorporated herein by reference. As can be appreciated and as will be discussed in greater detail below, longitudinal opening I 8, allows a mechanical connector or connectors between the carrier member (e.g. 10, FIGS. 4 and 5) and the drive tape (e.g. 12, FIGS. 4 and 5) to pass unobstructed while the carrier member is reciprocated along tape guide track sections (e.g. 22, FIGS. 4 and 5).

Figure 3:
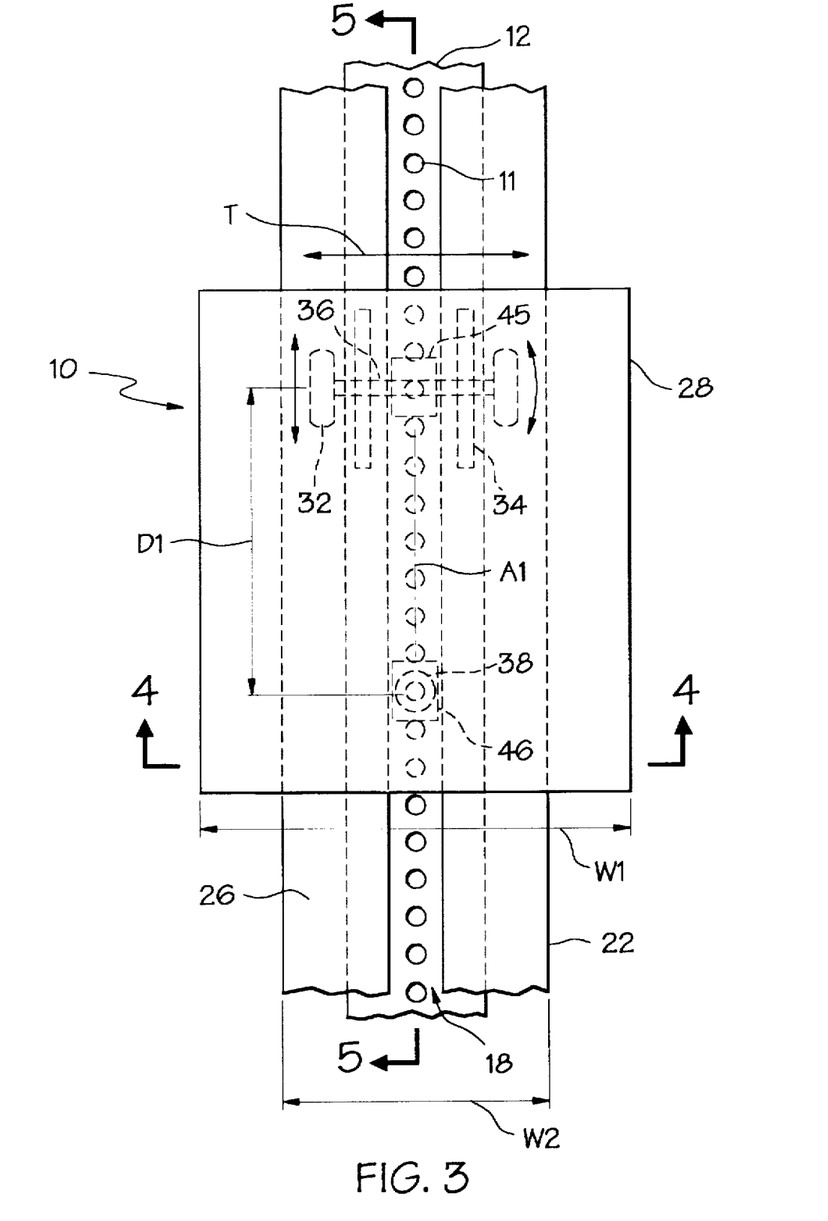
FIG. 3 is a partial elevational view of a carrier member attached to a drive tape which is partially housed in a tape guide.

FIG. 3 is a partial view of a carrier member 10 attached to a drive tape 12 via first and second attachment blocks 45 and 46, respectively. While it is preferred to utilize a plurality of attachment arrangements to provide for adequate stability of carrier member 10 with a drive tape 12, it should be understood that in some applications one attachment point, and in other applications, more than two attachment points, may be desirable and/or appropriate. The size, shape and weight of carrier member 10 will largely influence the number and type of attachment structures necessary A preferred embodiment of the present invention will be described in conjunction with the carrier member 10 which has a width W1 which is slightly larger than the width W2 of tape guide track section 22.

It may be desirable in many applications to minimize unnecessary contact between carrier member 10 and tape guide track 22 during the reciprocation of drive tape 12. FIG. 3 shows a cross-sectional view of carrier member 10, tape guide track 22, drive tape 12 wherein there are provided two predetermined gap distance,; D2 and D3 between the underside 27 of carrier member housing 28 and outer surface 26 of tape guide track section 22 As will be understood, distances D2 and D3 can vary from time to time in use as carrier housing 28 leans towards one side or the other of track 22. For example, the load within carrier member housing 28 may shift from one side to the other, or the orientation of carrier member housing 28 can change as carrier 10 is reciprocated over a twisted guide track section, for example, 13, as shown in FIG. 2.

Figure 4:
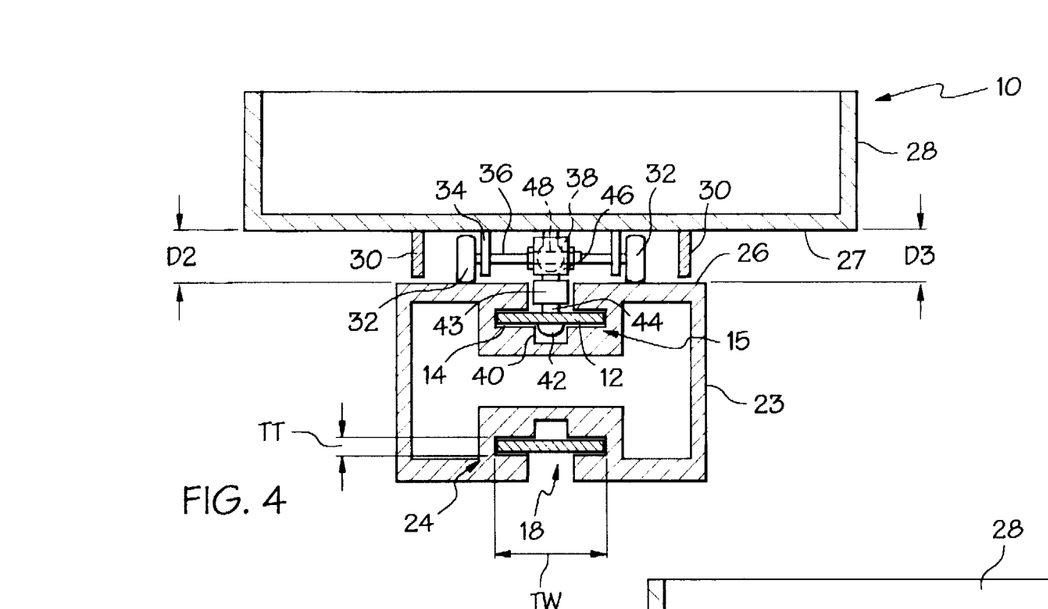
FIG. 4 is a cross-sectional view of the carrier member, tape guide track and drive tape of FIG. 3, taken along line 3—3 thereof.
Figure 5:
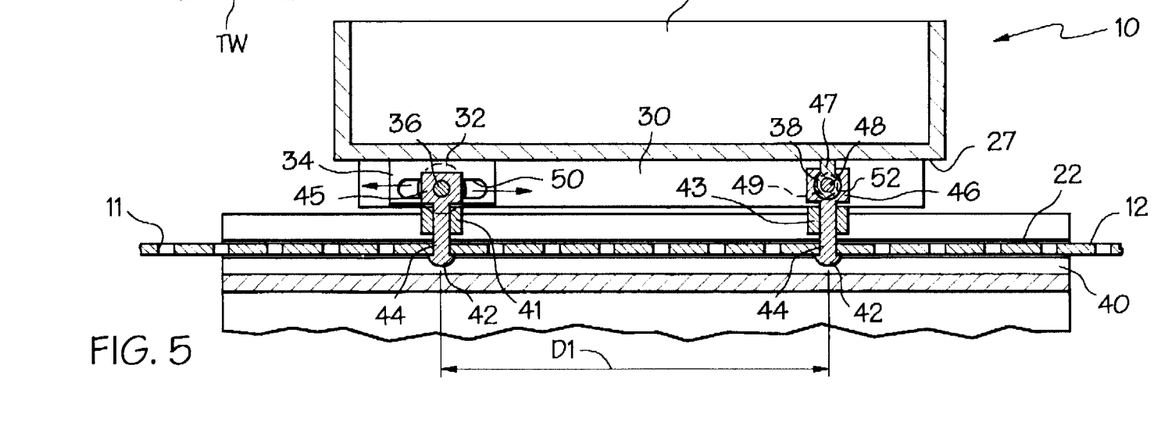
FIG. 5 is a longitudinal partial cross-section of the carrier member, drive tape and tape guide system of FIG. 2 taken along line 4—4 thereof.

To avoid unnecessary frictional wear on the carrier member 10, its underside 27 and track 22 and to minimize undue resistance and drag, it is preferred to maintain D2 and D3 greater than 0 on both sides of guide track 22. A preferred method for maintaining a space between the carrier member underside 27 and guide track 22 is through the use of runners 30. Runners 30 can be manufactured from any of a variety of available materials including metals, hard plastics, rubber and the like and should generally be compatible with the materials of guide track 22 to avoid galling or unnecessary wear when the two surfaces contact one another. It is even more preferred to provide at least one rotating contact between carrier member receptacle 28 and guide track 22. A preferred rotating contact is shown in FIG. 3, 4 and 5 as a combination of wheels 32 and axle 36. The rotating contact can be any of a variety of known rollers in the art, e.g. casters, wheels bearings and the like. Likewise the rotating contact can be made from any appropriate materials such as rubber, hard plastic and metals.

As is best shown in FIGS. 3, 4, and 5 axle 36 is preferably connected to attachment block 45 and to drive tape 12 with bolt 44 having an enlarged bolt head 42 which secures attachment block 45 to drive tape 12 through a perforation 11. A recess 40 is also preferably provided in tape guide 15 to accommodate bolt head 42 as carrier member 10 and drive tape 12 are reciprocated.

It is generally necessary for axle 36 to have some freedom of movement, as is shown in FIGS. 3 and 5. In the embodiments illustrated, the freedom of movement for axle 36 is provided by slots 50 in mounting braces 34. There are two mounting braces 34, each having a slot 50, wherein each mounting brace 34 is fixedly attached to the underside 27 of carrier member receptacle 28 to provide the necessary connection between carrier member 10 and drive tape 12. As will be understood, axle 36 is free to move within slot 50 of mounting brace 34 in a direction parallel to longitudinal axis A1 of drive tape 12, and (as a result of relative movement in the respective slots 50) to rotate in a limited manner within a plane which is parallel to both the underside 27 of carrier receptacle 28 (as indicated in FIG. 3). Thus, as a drive tape is twisted (e.g. drive tape 12 within guide track 13, FIG. 2) or as a drive tape is bent around a 90° bend (e.g. drive tape 12 within guide track section 16, FIG. 2) it is especially preferred that: the two connections to the underside 27 of carrier receptacle 28 allow at least some limited flexibility to accommodate for the changes in distances D1, D2 and D3 as a drive tape 12 is manipulated. The underside 27 of carrier receptacle 28 can be substantially rigid, and if all connections to the drive tape 12 were also rigid attachments to underside 27, unnecessary strain may be placed on both drive tape 12 and attachment bolts 44 as well as the attachment to underside 27. Provision of slots 50 or other structures to provide some tolerance for movement, allow axle 36 to move in a direction substantially parallel to the longitudinal axis A1 of drive tape 12 and slots 50 provide axle 36 with the ability to rotate in a plane substantially parallel to drive tape 12, thus, helping to reduce or eliminate the stresses which would otherwise be placed on attachment bolts 44 and drive tape 12 as the drive tape 12 is bent and/or twisted within a tape guide, e.g. 13 and 16 of FIG. 2.

For similar reasons, it is preferred to use a swivel connection, for example universal joint 38, as shown in FIG. 4 and 5 for at least one of the connections between carrier receptacle 28 and drive tape 12. Universal joint 38 is illustrated as comprising a shaft 47, a swivel housing 52 and a swivel 49 wherein the shaft of bolt 48 fits within the swivel 49 of Universal joint 38. As bolt 48 contacts the swivel housing 52 of universal joint 38, the universal joint swivel 49 is restricted in movement. The use of a universal joint is intended to further reduce potential stresses and strains on drive tape 12 and attachment bolt 44 by allowing for limited movement of the attachment means between carrier member 10 and drive tape 12. As discussed above, such limited movement of the attachment means is preferred to accommodate for a variety of stresses and strains transmitted to the attachment block (e.g. 45 and 46) as drive tape 12 is twisted and/or bent within a tape guide track section. As can be appreciated, other appropriate connectors and connection arrangements, for example flexible couplings, springs, hydraulic shafts and the like may be substituted to accomplish these same purposes. Additionally, simpler means for connecting carrier member 10 to drive tape 12 can be used, including one or more rigid bolt-like connections.

An especially preferred method for reducing wear on attachment blocks 45 and 46 is to place a bearing, sleeve or other rolling device of generally cylindrical geometry, e.g. rollers 41 and 43, on the attachment bolt, e.g. 42. Rollers 41 and 43 can be made of any material that is frictionally compatible with longitudinal opening 18 and attachment bolt 42, for example, an oil impregnated brass sleeve is especially preferred for rollers 41 and 43. Rollers 41 and 43 should have an exterior diameter which is less than the width of longitudinal opening 18 so that they are normally spaced apart from longitudinal opening 18. Contact between rollers 41 and 43 and longitudinal opening 18 occurs generally when the weight of the carrier member, e.g. 19, FIG. 1, is shifted, for example when carrier member 19 traverses twisted track 26. The spacing between rollers 41 and 43 and longitudinal opening 18 is a design consideration within the skill of one of ordinary skill in the art. Preferred spacing between rollers 41 and 43 and longitudinal opening 18 is in the range of from about 0.030" to about 0.050" (from about 0.8 mm to about 1.3 mm).

The drive mechanism (e.g. 9, FIG. 1) used to reciprocate drive tape 12, and subsequently any and all carrier members attached thereto, can generally be any drive wheel, cog or the like, which is rotatably driven by a reversible motor. U.S. Pat. No. 5,054,605 (the '605 Patent) to Edward F. Bavis, gives a detailed description of an appropriate drive mechanism for a flexible tape drive conveyor system. The entire disclosure of the '605 Patent is hereby incorporated herein by reference. Additionally, the '408 Patent, which has been incorporated herein by reference above, also discloses a cog drive wheel drive motor (collectively the drive mechanism) arid flexible drive tape arrangement. Likewise, the '605 and '408 Patents described flexible drive tapes which can be utilized herein. One suitable material which can be utilized for drive tape 12 is "dymetrol" tape available from E.I. duPont deNemours and Company of Fayettville, N.C. The present invention is described herein in conjunction with one preferred embodiment for the drive tape 12 which, as can be seen in the cross-sectional view in FIG. 4, the thickness TT of the tape is substantially less than the width TW of the tape. The cross-sectional view of drive tape 12 shown at FIG. 4 is only possible embodiment of the present invention and is not meant to be limiting. The cross-sectional configuration of drive tape (e.g. 12, FIG. 4), in conjunction with a drive tape material, which is substantially rigid so that it can be both pushed and pulled within a tape guide without substantial deformation or collapse, renders drive tape 12 substantially inflexible in a direction transverse to its width, as is best seen in FIG. 3 by the directional arrow T. Thus, moving the drive tape in a direction transverse to its width T is substantially restricted by the material of manufacture and the cross-sectional geometry of drive tape. However, the substantial transverse rigidity of the drive tape and its cross-sectional configuration make the drive tape suitable for non-continuous, reciprocating drive arrangements. In other words, the rigidity of the drive tape which makes it suitable for non-continuous reciprocation conveyor systems is the same rigidity which restricts its movement in a direction transverse to its width T. As will be appreciated, to support and guide a drive tape, e.g. 12, the guide track sections, e.g. 13, 16., and 22, must have substantial rigidity while having enough malleability to be twisted and/or bent, e.g. guide track sections 13 and 16, to provide the necessary bent, straight and/or twisted confirmation required by the present invention.

Guide track sections 13, 16 and 22 can be made from any suitable material. High density plastic, metals and the like are all suitable materials for guide track construction. However, when the tape guide tracks are formed of relatively smooth, rigid materials such as anodized aluminum, no additional lubrication generally is necessary for continuous and reliable operation of drive tape 12. Likewise, an ultra high molecular weight, self-lubricating plastic can provide the same smooth reliable operation. However, a plastic guide track may need additional support structures (e.g. support bracket 31, FIG. 1) whereas an aluminum or other metal guide track can serve as its own support for the drive tape/carrier member combination. Additionally, drive tape guide tracks can be provided as modular segments, or one guide track can be twisted, bent and/or straightened to provide a conveyor system comprising only one guide track section.

Drive tape guide tracks can be manufactured by any suitable means, for example, machining, molding, forging, extruding and the like. The size and shape of the longitudinal channel 14 and longitudinal opening 18 will be dictated by the drive tape and attachment means respectively. While not intending to be limited lo any particular size or geometric configuration, a longitudinal channel having a width of from about 0.5 to about 0.7 cm and a length of from about 1.0 to about 1.5 cm has been used in conjunction with a drive tape within the same ranges. The dimensions of the longitudinal channel (i.e. length and width) should be from about 5.0% to about 10.0% larger than the dimensions of the drive tape to avoid binding and unnecessary friction within the longitudinal channel. The length of the longitudinal opening will necessarily be dictated by the size of the attachment means and the opening should generally not exceed 85% of the longitudinal channel's width.

Guide track sections can be provided with one tape guide, as schematically shown in FIG. 2, or a guide track section, for example, guide track section 22, can be provided with a first tape guide 15 and a second tape guide 24 for partially housing drive tape 12. The '408 and the '605 Patents discussed above, contain additional discussion of the second tape guide, which can be used to partially house the drive tape after it has been reciprocated around the drive mechanism. As shown in FIG. 4, the tape guide track 22 can be hollow, which provides space to run wires, sensors and the like on the interior of the track, leaving the exterior free of material which might interfere with the operation of the drive tape and/or carrier member.

A variety of alternatives are available for manufacturing twisted guide tracks of the present invention, e.g. 13 of FIG. 2. For example, a track made from a malleable plastic, e.g., polypropylene, polyethylene and the like can be readily twisted by securing one end of the track, twisting the track to the desired angle and securing the opposite end of the track. Likewise, a metal guide track, e.g. aluminum, steel, stainless steel, can be mechanically secured at both ends and then mechanically twisted to the desired angle of rotation. As was discussed briefly above, the track is preferably twisted from about 0° to about 90°, although, any degree of twist can be implemented. The degree of rotation is somewhat arbitrary in that the track can be twisted a full 360° or more if the materials of construction will allow. However, because a typical drive tape bends relatively easily in a direction transverse to its length, as is shown by tape guide tracks 16, FIG. 2, it is often desirable to minimize the degree of twist (i.e. the degree of rotation about the longitudinal axis of the drive tape), and utilize the "bending" motion of the tape to complete the necessary directional movement of the drive tape, as is shown in FIG. 1 and FIG. 2 with the combination of guide tracks 16 and 13.

As can be appreciated, there is a maximum degree of twist or rotation that any drive tape can withstand for a given length of drive tape. Twisting the drive tape too quickly can cause the tape to fracture, crack or otherwise be rendered unserviceable. The maximum degree of twist or rotation/per unit length of drive tape will necessarily depend on variables such as the material the drive tape is constructed from, as well as the cross-sectional configuration of the drive tape, i.e., the ratio of the width to the length. Size, shape and number of the drive tape perforations will also affect limitations on the ability of a particular drive tape to be rotated or twisted. Additionally, the carrier member, which necessarily must be rotated along with the drive tape during reciprocation along the system, will put additional forces on the drive tape and tape guide tracks due to centrifugal forces. Thus, the weight of the carrier member, the distance from the drive tape, and the nature of the cargo being transported by the carrier member, will all effect the amount of rotation that will be appropriate per unit length of a drive tape.

Moreover, the tape guide track may be limited in the amount of rotation per unit length, and this limitation will also depend on the material of construction and the geometry of the tape guide track. However, if necessary, the material of construction for the tape guide track can be selected to be more flexible than the drive tape, thus obviating the need to specifically determine the maximum degree of rotation allowable for the tape guide track. The simplest method for determining the maximum desirable degree of twist or rotation/per unit length of a particular drive tape is to hold one end of a predetermined length of drive tape in one hand and grasp the other end of the drive tape in the other hand and twist the tape until it cracks, fractures, deforms or can no longer be twisted by hand. Although crude, this method can yield an estimate for the minimum length of tape required for a given degree of rotation. This same test can be performed mechanically, wherein two ends of a drive tape, or track guide track, can be secured to a rotational device, e.g. a lathe, and the amount of force required to rotate a predetermined length of tape, or tape guide track, a predetermined amount, e.g. 90°, can be measured. The maximum degree of rotation can be used for design purposes as a value never to be exceeded. However, to minimize maintenance, and to avoid premature failure of the drive tape, the maximum degree of rotation used when designing guide tracks should generally be substantially less than the maximum amount of rotation allowable.

The carrier member housing 28 can similarly be made of any appropriate material, or combination of materials. For example, aluminum, steel, stainless steel and plastics are all suitable for carrier member housing construction. The size and shape of the carrier member will be dictated primarily by the intended cargo being transported from one station to the next and, of course, other limitations on the conveyor system such as space available and size of drive mechanism to be used. As seen best in FIG. 6, the carrier housing outer side 52 is shown as comprising a mesh material, although any suitable material (e.g. plastic metal or the like) can be used.

Figure 6:
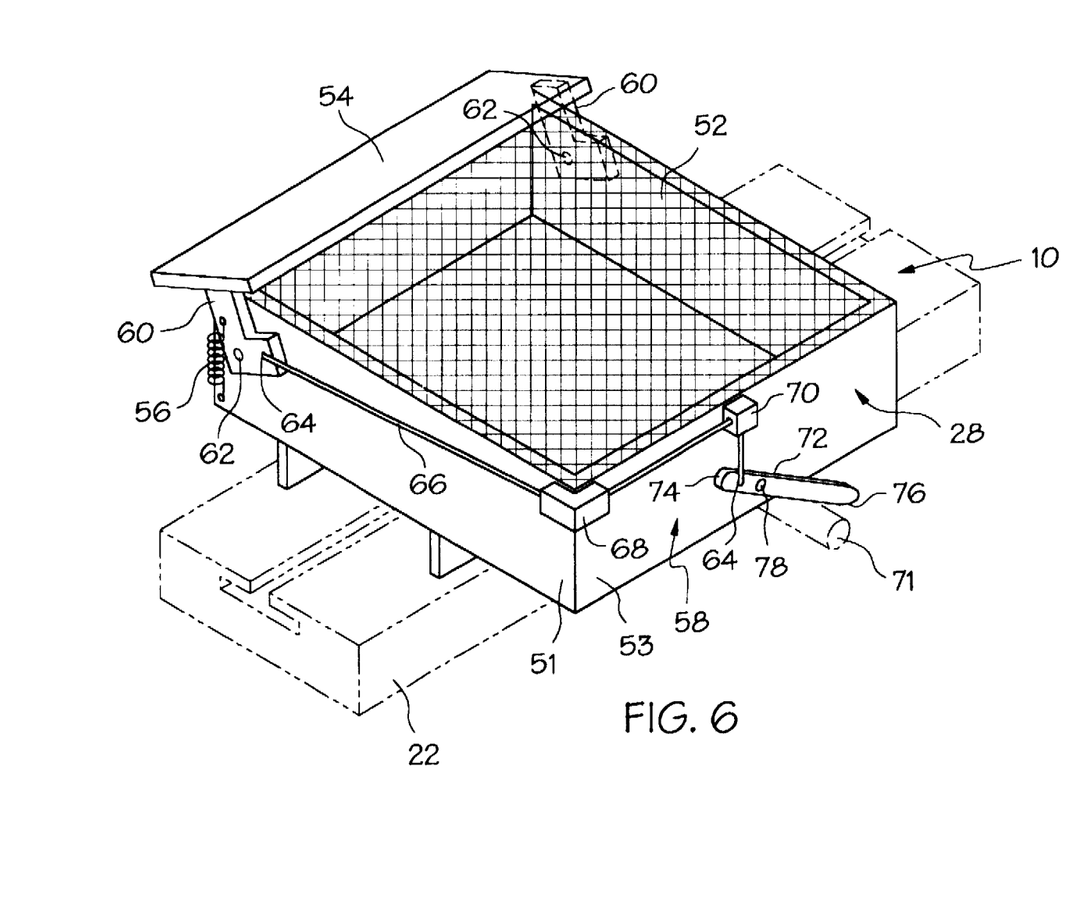
FIG. 6 is an isometric view of preferred embodiment of a carrier member of the present invention having a selectively reciprocated door mechanism.

Carrier member 10 is preferably a substantially enclosed housing having one or more access doors, e.g., 54, FIG. 6. The cargo should be secure while being transported between spaced apart stations, thus mesh type materials, as shown in FIG. 6, are appropriate for enclosing carrier housing 28 if the intended cargo cannot slip through the openings in the mesh. Alternatively, means for securing cargo such as clips, clamps, belts, and the like can be used, although an enclosed housing generally provides the greatest degree of flexibility for the cargo to be transported there within.

Providing an easily accessible enclosed housing necessarily requires a door or other means of selective access to the cargo within the carrier member. A reciprocable door 54 and door control mechanism 50 are shown in FIG. 6. A preferred door control mechanism 58 for reciprocable door 54 is illustrated as comprising two oppositely disposed actuator arms 60 attached adjacent the door sides and to carrier housing sidewalls 51 with pin 62. Pin 62 provides a rotatable connection between the carrier housing sidewalls 51 and reciprocable door 54. Additionally, a biasing member, shown as a spring 56 in FIG. 6, preferably biases reciprocable door 54 to its normally closed position. In FIG. 6, reciprocable door 54 is shown in its partially opened position.

In the embodiment illustrated, reciprocable door 54 is opened when cable actuator arm 72 contacts station door actuator 71 as carrier member 10 is reciprocated into alignment with a station, e.g. 8, FIG. 1. Likewise, as carrier member 10 is reciprocated away from a station, cable actuator arm 72 disengages from station door actuator 71 and spring 56 closes door 54. Cable actuator arm 72 preferably contacts the station door actuator 71 near its actuator end 76, wherein actuator arm 72 pivots about a connector pin 78, which rotatably attaches actuator arm 72 to housing rear wall 53. As the actuator end 76 of actuator arm 72 is moved towards the carrier housing outer side 52, the cable end 74 of cable actuator arm 72 is moved away from carrier housing outer side 52, pulling cable 66. Cable 66 is illustrated as being connected to cable actuator arm 72 at cable connection 64, and is guided by one or more cable guide blocks (e.g., 70 and 68) pulling door actuator arm 60 so as to urge reciprocable door 54 to its open position. As can be appreciated, a variety of mechanical, electrical, hydraulic means and the like can be equally substituted for control mechanism 50 to selectively reciprocate a carrier housing door as the carrier housing is reciprocated between spaced apart stations. The specifics of door control mechanism 50 shown in FIG. 6 are provided only as one preferred example.

The spaced apart stations (e.g. 8, 80 and 81, FIG. 1), which the carrier member of the present invention is reciprocated between are described in greater detail in the '605 Patent, which has been incorporated herein by reference above. The stations can be located near the end of the guide tracks, as shown in the '605 Patent and 8, FIG. 1, or can be located at a number of points along a particular guide track, e.g. 80 and 81, FIG. 1. For example, a carrier member may stop at one point on a guide track to service a person in an automobile, e.g. 81, while stopping at a second point on the guide track to service a person in a larger vehicle such as a truck or van, e.g. 80. The height at which the carrier members stops can be controlled either by an operator, e.g., a person at the other end of the guide track, or by electronic sensors incorporated within the guide track as shown in the '605 Patent. Moreover, the conveyor system may include more than two stations among which a carrier may be selectively reciprocated. To accommodate communication between the spaced apart stations, e.g. 8, 80 and 81, any of a variety of commonly used communication systems, e.g. 90, can be optionally provided with the conveyor systems of the present invention, e.g. 7. Combinations of speakers and microphones can provide one way or two way communication between spaced apart stations as desired.

Having shown and described the preferred embodiments of the present invention, further adaptations of the flexible drive system described herein can be accomplished by appropriate modifications by one of ordinary skill in the art without departing from the scope of the present invention. Several of these potential modifications have been mentioned, and others will be apparent to those skilled in the art. For example, guide tracks need not be mechanically twisted, but can be forged or molded into preconfigured twisted conformations. Likewise, a single track section can be both twisted and bent to accommodate a multitude of changes in direction as opposed to each section of track being either twisted, bent or straight. Similarly, while the guide trick illustrated herein is shown as comprising a plurality of connected, modular sections, a guide track could possibly be provided in a unitary condition for particular applications. Accordingly, the scope of the present invention should be considered in terms of the following claims and is understood not to be limited to the details of structure and operation shown and described in the specification and drawings.

I claim:

1. An improved conveyor system for reciprocating a carrier member between a plurality of stations, said system comprising:
    a reciprocable, flexible drive tape having a longitudinal length and a predetermined width, said tape being substantially inflexible in the direction transverse to its width;
    a carrier member attached to said drive tape;
    a drive mechanism for engaging said drive tape and selectively reciprocating said tape between a plurality of stations; and
    a first tape guide within which said drive tape is at least partially housed, said first tape guide having a longitudinal axis and extending at least partially between a pair of stations, at least a portion of said first tape guide having a twisted conformation along its longitudinal axis, whereby an attached carrier member may be selectively reciprocated and manipulated in a direction transverse to said width of said drive tape.

2. The conveyor system of claim 1, wherein said first tape guide further comprises a longitudinal channel extending along said longitudinal axis for receiving and guiding said drive tape.

3. The conveyor system of claim 2, wherein said first tape guide has an outer surface and said longitudinal channel and said outer surface are twisted along said longitudinal axis such that said outer surface is at least partially rotated relative to said longitudinal axis.

4. The conveyor system of claim 3, wherein said outer surface and said longitudinal channel are twisted between about 0° and 90° relative to said longitudinal axis.

5. The conveyor system of claim 1, wherein said carrier member is attached to said drive tape with at least one rotatable connection member.

6. The conveyor system of claim 5, wherein said at least one rotatable connection member comprises a swivel.

7. The conveyor system of claim 5, wherein said at least one rotatable connection member comprises a universal joint.

8. The conveyor system of claim 1, wherein said carrier member further comprises a housing with an underside, there being at least one axle attached to said underside and having at least one wheel rotatably attached thereon, and said wheel being located between said outer surface of said first tape guide and the underside of said housing.

9. The conveyor system of claim 8, wherein said axle is movably attached to said underside of said housing by whereby limited movement of said axle is provided in a plane which is substantially parallel to the outer surface of said first tape guide.

10. The conveyor system of claim 1, wherein at least a portion of said drive tape is partially housed in a second tape guide and said drive tape is non-continuous.

11. The conveyor system of claim 1, wherein said carrier member further comprises a reciprocable door which is selectively actuated by a door controller as said carrier member is reciprocated between spaced apart stations.

12. The conveyor system of claim 11, wherein said door controller comprises at least one biasing member which biases the door towards its closed position, at least one door actuator arm attached to said door, a cable actuator arm and a cable connecting said cable actuator arm to at least one of said door actuator arms.

13. An improved conveyor system for reciprocating a carrier member between a plurality of stations, said system comprising:
    a reciprocable, flexible drive tape having a longitudinal length and a predetermined width, said tape being substantially inflexible in the direction transverse to its width;
    a carrier member attached to said drive tape;
    a drive mechanism for engaging said drive tape and selectively reciprocating said tape between a plurality of stations; and
    a first tape guide within which said drive tape is at least partially housed, said first tape guide having a longitudinal axis and extending at least partially between a pair of stations, and a longitudinal channel extending along said longitudinal axis for receiving and guiding said drive tape and an outer surface at least a portion of said first tape guide having a twisted conformation along its longitudinal axis, wherein said longitudinal channel and said outer surface are twisted along said longitudinal axis such that said outer surface is at least partially rotated relative to said longitudinal axis, whereby said carrier member may be selectively reciprocated and manipulated in a direction transverse to said width of said drive tape.

14. The conveyor system of claim 13, wherein said outer surface and said longitudinal channel is twisted between about 0° and 90° relative to said longitudinal axis.

15. The conveyor system of claim 13, wherein said carrier member is attached to said drive tape with at least one rotatable connection member.

16. The conveyor system of claim 13, wherein said carrier member further comprises a housing with an underside, there being at least one axle attached to said underside, said axle having at least one wheel rotatably attached thereon, and said wheel being located between said outer surface of said first tape guide and the underside of said housing.

17. The conveyor system of claim 16, wherein said axle is attached to said underside of said housing by a slotted brace so that said axle is capable of limited movement in a plane which is substantially parallel to the outer surface of said first tape guide.

18. The conveyor system of claim 13, wherein said carrier member further comprises a reciprocable door which is actuated by a door controller as said carrier member is selectively reciprocated to and from said spaced apart stations.

* * * * *